United States Patent
McEvoy

(10) Patent No.: US 9,324,083 B2
(45) Date of Patent: Apr. 26, 2016

(54) BOOKING SYSTEM AND METHOD

(75) Inventor: Dean McEvoy, Alexandria (AU)

(73) Assignee: Dean Thomas McEvoy, Paddington NSW (AU)

( * ) Notice: Subject to any disclaimer, the term of this patent is extended or adjusted under 35 U.S.C. 154(b) by 339 days.

(21) Appl. No.: 12/776,426

(22) Filed: May 10, 2010

(65) Prior Publication Data

US 2010/0235201 A1     Sep. 16, 2010

Related U.S. Application Data

(63) Continuation-in-part of application No. 10/990,474, filed on Nov. 18, 2004, now abandoned.

(51) Int. Cl.
G06Q 10/00     (2012.01)
G06Q 30/02     (2012.01)
G06Q 10/02     (2012.01)

(52) U.S. Cl.
CPC ............... *G06Q 30/02* (2013.01); *G06Q 10/02* (2013.01)

(58) Field of Classification Search
None
See application file for complete search history.

(56) References Cited

U.S. PATENT DOCUMENTS

| | | | | |
|---|---|---|---|---|
| 5,991,739 | A * | 11/1999 | Cupps et al. | 705/26 |
| 6,834,048 | B1 * | 12/2004 | Cho et al. | 370/356 |
| 7,188,073 | B1 * | 3/2007 | Tam et al. | 705/9 |
| 7,577,664 | B2 * | 8/2009 | Malik | |
| 7,852,997 | B2 * | 12/2010 | Fowler et al. | 379/142.07 |
| 2003/0097305 | A1 * | 5/2003 | Ogino et al. | 705/26 |
| 2005/0203782 | A1 * | 9/2005 | Smith | 705/5 |
| 2008/0167946 | A1 * | 7/2008 | Bezos et al. | 705/10 |
| 2010/0070295 | A1 * | 3/2010 | Kharraz Tavakol et al. | 705/2 |

* cited by examiner

Primary Examiner — Tonya Joseph
(74) Attorney, Agent, or Firm — Molins & Co Pty Ltd

(57) ABSTRACT

A method enabling owners of websites to monetize their local listings by implementing online bookings, reservations or orders using an interactive voice recognition (IVR) system. A user of a web-based interface requests a booking or order by entering parameters, for example, name of the restaurant, number of people, date and time. The software of the present invention calls the restaurants telephone using the IVR and confirms or rejects (refuses) the booking. The invention allows for the payment of commissions for originating or facilitation of bookings or orders or the registration of participating restaurants. The booking service is paid by the restaurant for successful bookings. Credit is made for cancelled or no-show bookings. The invention includes a loyalty points system that rewards frequent users of the booking service.

23 Claims, 15 Drawing Sheets

| 1400 | Open | Close | M | T | W | T | F | S | S |
|---|---|---|---|---|---|---|---|---|---|
| Restaurant A | 7:00 | 10:00 | 0 | 0 | 0 | 0 | 0 | 1 | 1 |
| Restaurant A | 12:00 | 14:00 | 1 | 1 | 1 | 1 | 1 | 0 | 0 |
| Restaurant A | 17:00 | 23:00 | 0 | 1 | 1 | 1 | 1 | 1 | 1 |

```
<restaurant>
<name>Bay Hong</name>
<phone>93608688</phone>
<phoneAreaCode>2</phoneAreaCode>
<phoneCountryCode>61</phoneCountryCode>
<email>bayhong@gmail.com</email>
<website>www.bayhong.com.au</website>

<signed>true</signed>          ← 1502

<display>true</display>        ← 1504

<bookingLink>                  ← 1506
    http://service.bookingangel.com/book/book.php/initial/1/ref/1/id/
    61293608688
</bookingLink>

← 1508
<imageLink>
    http://service.bookingangel.com/book/getblankimage.php/1/
    61293608688
</imageLink>

<contact>
<type>Manager</type>
<primary>false</primary>       ← 1510a
<firstName/>
<lastName>Huynh</lastName>
</contact>

<contact>
<type>Owner</type>
<primary>true</primary>        ← 1510b
<firstName>Hong</firstName>
<lastName>Tran</lastName>
</contact>

<address>
<streetAddress>294 Crown St</streetAddress>
<suburb>Darlinghurst</suburb>
<state>New South Wales</state>
<country>Australia</country>
<postcode>2010</postcode>
</address>
</restaurant>
```

```
<script type="text/javascript"
    src="http://www.staging.bookingangel.com/resources/scripts/ba.basic.js"></script>
<script>
BA.onReady = function(){
/**
* countryCode is important.
* If your page is listing phone numbers with countrycode, this param can be left out!
* class, href etc. can be specified as elementAttribs
*
* Automatically finds out if an element have a matching 'autoDetectPattern' in its classname.
* For this, the supplier phone number should also be specified in classname followed by pattern
* (presedence is important. Format class="autoDetectPattern RESTAURANT_PHONE")
* and the element must have an 'id'.
* eg. if autoDetectPattern is 'ba-identify' the supplier phone will be specified as follows
* <span id="restaurant-1" class="ba-identify 13103721202 other_classnames_if_any">Tx<span>
*
* Can specify other html elements to show the popup by using 'unlistedNumbers' attribute.
* For this the restaurant phone number and the element id must be passed as pairs.
*/
BA.start(
        {
        shadowOpacity:40,
        hideOnMouseOut:true,
        affiliateId:1,
        buttonLabelText:'Rserve Now', //if specified text content replaced by 'buttonLabelText'
        buttonLabelAppend:true, //if false, text content will be appended by 'buttonLabelText'
        delayOnMouseOut:700,
        elementAttribs:[['class', 'baButton']], unlistedNumbers:[[13367480200, 'ul1'], [14157525652, 'ul2']], //Restaurant number
        autoDetectPattern:'ba-identify',
        mode:'REMOTEDEBUG'
        }
        );
}
</script>
```

FIG. 17

BOOKING SYSTEM AND METHOD

The present United States patent application is a continuation-in-part from U.S. patent application Ser. No. 10/990,474. Any discussion of the prior art throughout the specification should in no way be considered as an admission that such prior art is widely known or forms part of the common general knowledge in the field.

FIELD OF THE INVENTION

The present invention relates generally to computerized booking and order systems, including customer loyalty programs.

More specifically, the present invention relates to using an interactive voice recognition system connected to the Internet for making a booking or order. However, it will be appreciated that the invention is not limited to this particular field of use.

DESCRIPTION OF RELATED ART

The present invention is disclosed with reference to making reservation bookings at a restaurant. It will be understood that this is provided by way of example and that the invention may be applied to any industry or target businesses where appointments, bookings or orders are made. Examples of such industries include hairdressers, hotels and other forms of accommodation, doctors and dentists, and retail outlets having little or no Internet presence or who don't already have e-commerce capabilities.

The Internet has a large number of web sites, search engines, and directories of information regarding restaurants. The information may include location, type of cuisine, cost, atmosphere, or a rating by customers or a critic. While these support Internet users in selecting a desirable restaurant, none of these sites, engines, or directories has a satisfactory way of facilitating online bookings. Instead, restaurants are approached by a number of advertising proposals for various promotional or business-building media. These include preferred listing in search engines or directories, links to and from related sites, banner advertisements in web browser screens, and others. These media, however, provide no guarantee to the restaurant of the return they will receive.

There have been some attempts to provide on-line booking systems for restaurants. These systems, however, have relied on e-mail or fax communications with the restaurant except for a few US and UK sites (such as opentable.com or toptable.co.uk) that have convinced the restaurants to invest in specialised and sometimes expensive hardware and software that allows them to take fully automated online bookings. The other method requires that the restaurant frequently check for booking requests, a situation which is a change for most restaurants that rely on telephone, answer machine or fax machine messages. E-mail and fax systems are also not well set up to communicate back to the customer either to confirm or refuse the booking request. At least one on-line booking web site requires a restaurant to allocate a certain number of seats per night to be filled by on-line bookings. This, however, has proven to be impractical for many businesses, and has been adopted only by large restaurants that can allocate a regular number of tables.

What is needed is an online booking system that allows the customer to make booking requests on-line and receive an immediate confirmation. In the case of a booking rejection, the system would allow the customer to select alternate parameters (date, time, etc.) for the same restaurant to accept as an alternative, or to select another restaurant. The system would communicate with the restaurant using the telephone, and integrates with the existing booking systems already established at the restaurant. Finally, the restaurant would pay the booking service only for (at least) successful bookings.

OBJECTS OF THE PRESENT INVENTION

It is an object of the present invention to overcome or ameliorate at least one of the disadvantages of the prior art, or to provide a useful alternative.

It is therefore the object of the present invention to provide an on-line booking system allowing Internet users to request a booking and receive a confirmation while on-line or via email. It is a further object to allow a restaurant to register for the service and pay for successful bookings through the service.

It is a further object of the present invention to use an IVR system for communication with the requested restaurant to allow the restaurant to accept or refuse the user's booking request.

It is another object to provide alternative communication pathways (such as a call centre) to the restaurant and to the user in the event the IVR pathway is not available.

It is an alternate object of the present invention to provide a value-add proposition for web sites that assist in the deployment of the Booking Angel system, allowing web sited to retain users, build content, and increase volume.

It is a yet further object of the present invention to provide a loyalty system for regular customers of the service.

It is an additional object of the present invention to allow customers to provide feedback to the restaurant, possibly in exchange for loyalty points or product or service coupons or other consideration.

SUMMARY OF THE PRESENT INVENTION

According to an aspect of the invention there is provided a method for a web-site to enable a user of the web-site to make a reservation request, for the benefit of the user, the web-site coupled to a database having one or more data records each indicative of a venue, the method comprising the steps of:
  (a) identifying, within a web-page, a first candidate reference to a first venue;
  (b) querying the database for obtaining a first data record indicative of the first venue;
  (b) if the first data record is obtained, updating the web-page to have a first web-link associated with the first venue for requesting a reservation;
  (c) when the first web-link is selected by the user, prompting the user for reservation data indicative of a reservation request at the first venue;
  (d) transmitting the reservation data to a remote booking server that is coupled to interactive voice response facility; and
wherein the booking server is adapted to retrieve contact information of the first venue, create a voice message from the reservation data and contact information, the voice message indicative of the reservation request, enabling transmission of the voice message via the interactive voice response facility for communicating the voice message to an operator at the venue, receiving from the operator acceptance or rejection of the request, and informing the user of the operator acceptance or rejection.

Preferably, the remote booking server is adapted to perform the steps of:
  (a) combining the reservation data with venue information from a booking database;

(b) creating a voice message from reservation data and venue information, the voice message indicative of the reservation request including preferences;
(c) transmitting the voice message by calling the business using an interactive voice response facility coupled to the booking server;
(d) communicating the voice message to a human operator using the interactive voice response facility;
(e) receiving from the human operator, via the interactive voice response facility, confirmation or refusal of the reservation request;
(f) informing the user of the confirmation or refusal of the reservation request;
(g) storing, to the booking database, information regarding completed bookings attributable to the venue; and
(h) collecting a payment from the business.

According to an aspect of the invention there is provided a user access interface for a processor device, the processor device being couplable to a database having one or more data records each indicative of a venue; the processor device being adapted to render a web-page; the interface comprising a control module adapted to:
  identify, within the web-page, a candidate reference to a first venue;
  query the database for obtaining a first data record indicative of the first venue;
  if the first data record is obtained, render the web-page having a first web-link associated with the first venue for requesting a reservation; and
  when the web-link is selected by the user, the user is prompted for reservation data indicative of a reservation request for the first venue.

Upon publishing the web-page in response to the user requesting the web-page, the web-page is preferably updated dynamically by a web-server to incorporate the first web-link. Alternatively, in response to the user requesting the web-page, the web-page is preferably dynamically rendered by a web-browser to incorporate the first web-link.

Preferably, the first candidate reference to the first venue is a telephone number including area code or reference ID. More preferably, the first candidate reference is maintained within an accessible dataset (or database).

Preferably, if the first data record is obtained, the web-page is updated automatically to have a first web-link associated with the first venue for requesting a reservation.

Preferably, the web-page is dynamically parsed and amended by a code module operatively associated with the web-page, thereby to incorporate the first web-link.

According to an aspect of the invention there is provided a system to enable a user of a web-site to make a reservation request, for the benefit of the user, the system comprising:
  a database having one or more data records each indicative of a venue;
  a plurality of web-sites each having a web-page the includes one or more candidate reference to a venue;
  a web-server for publishing a web-page having a first candidate reference that is indicative of a first venue and corresponding first data record, wherein the web-page includes a web-link associated with the first venue for requesting a reservation;
  a booking module for the user to provide reservation data indicative of a reservation request for the first venue
  a booking server adapted to receive the reservation data from the booking module, to retrieve contact information for the first venue, create a voice message from the reservation data and contact information, the voice message indicative of the reservation request, and enabling transmission of the voice message via the interactive voice response facility for communicating the voice message to an operator at the venue, receiving from the operator confirmation of acceptance or rejection of the request, and informing the user of the operator acceptance or rejection.

Updating the web-page is preferably performed dynamically by a web-server when publishing the web-page, in response to the user requesting the web-page. Alternatively, updating the web-page is preferably performed dynamically by a web-browser when rendering the web-page, in response to the user requesting the web-page.

Preferably, the reservation data comprises a name of the venue, a date and time of requested reservation, a name of the user and contact details of the user. More preferably, the reservation data pertains to an order and the reservation data comprises details of an item ordered.

Preferably, the database comprises register records each indicative of a registered user. More preferably, the reservation data further comprises personal information of the user for checking against register records for confirming registration of the user.

Preferably, the database stores payment and billing information relating to each venue.

Preferably, the user is rewarded according to a customer loyalty scheme.

Preferably, reservation request includes any one or more of the following: a meeting request, booking request and an order request;

Preferably, the user is enabled to make restaurant bookings.

Preferably, a commission is paid by an operator of the booking server to an operator of the web-site.

Preferably, the database has one or more data records each indicative of a venue including any one or more venues:
  registered in respect of the web-site, whereby the registration has been communicated to the booking server by an operator of the web site;
  registered in respect of the booking server;
  identified as a unregistered venue.

Under directions communicated by the telephone connection from the IVR facility, a telephone keypad is preferably used for providing confirmation of acceptance or rejection of the request.

According to a further aspect of the invention there is provided a computer program product stored on a computer usable medium, the computer program product adapted to provide a method of for a web-site to enable a user of the web-site to make a reservation request, as herein described.

According to a further aspect of the invention there is provided a computer readable medium for operation with a processor device, the computer readable medium comprising computer code for executing a method comprising the steps of: a method of for a web-site to enable a user of the web-site to make a reservation request, as herein described.

According to a further aspect of the invention there is provided an on-line booking method, herein referred to as the "Booking Angel", which allows an Internet user, after selecting a restaurant, to request a booking, enter desired date, time, number and other information. The booking request is communicated to the restaurant using an interactive voice response (IVR) system, and booking confirmation or refusal is input by using the keys on the phone. This is communicated back to the user while still on-line or sent via email or SMS. The restaurant registers for the Booking Angel service and pays for successful reservations booked through the service. Booking Angel has a customer relationship management system attached to it that manages all customer interactions from sign up, ongoing maintenance through to billing and reporting. The system integrates with a call centre and allows communication with restaurants and users via fax, email, phone, SMS, post and IVR.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 15 is an embodiment implementation of an online XML schema;

FIG. 17 is an embodiment implementation of an Java script applet;

DESCRIPTION OF THE BEST MODE AND PREFERRED EMBODIMENT

The invention is a computerized services implemented to assist businesses in attracting and communicating with customers. While the description below uses restaurants as an example, the invention can also be used to assist other retail and service business types.

The invention, or "Booking Angel", is a subscription booking service for restaurants. The registration process may include the payment of a one-time or subscription fee. Once registered, the restaurant will receive on-line booking requests via IVR telephone and will pay a fee for successful bookings.

Figure 1:
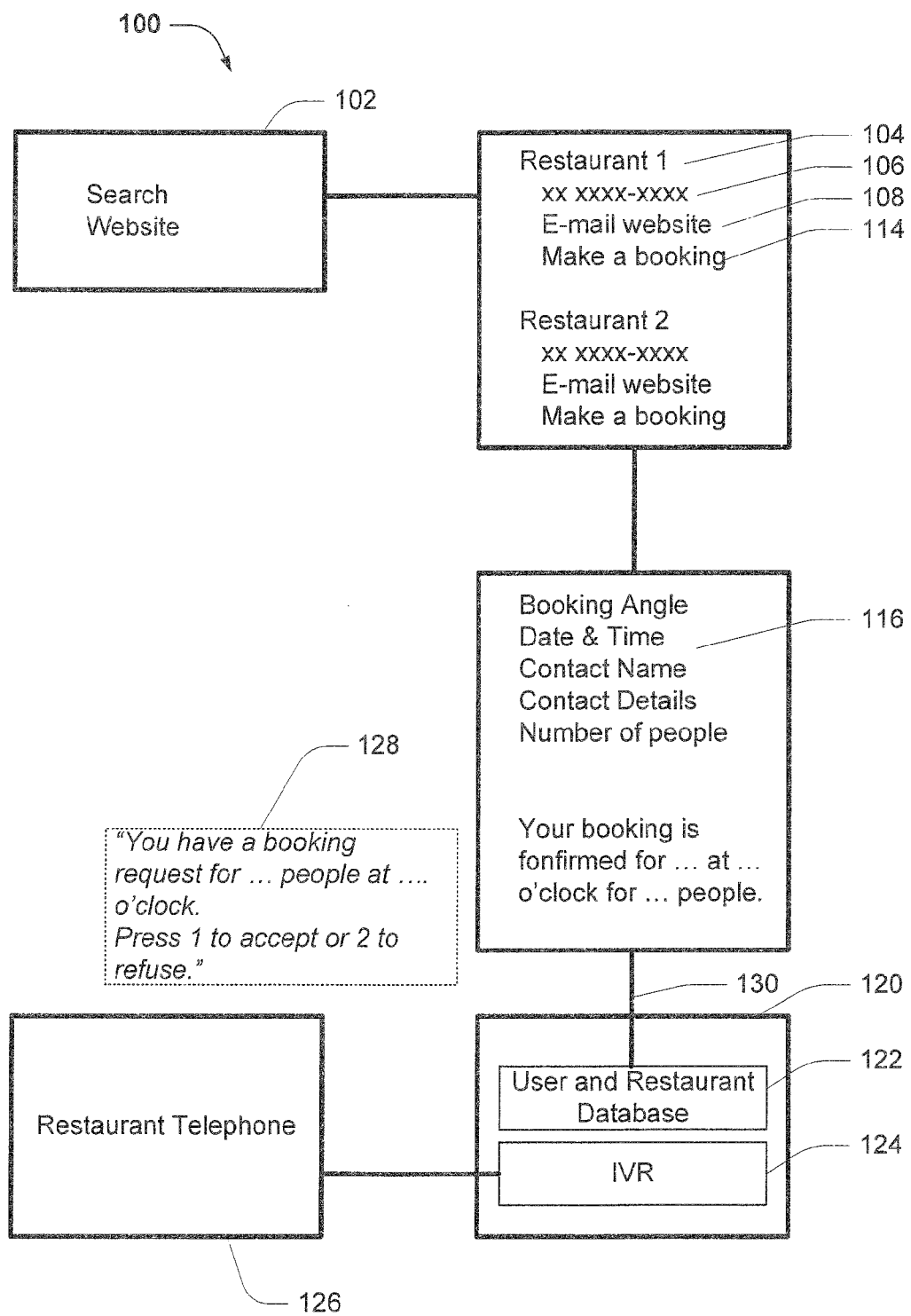
FIG. 1 illustrates an overview of the Booking Angel service.

The Booking Angel interacts with an Internet user who desires to make a booking with a subscribed restaurant. The user may reach the Booking Angel web site in a number of ways. These include going directly to the Booking Angel web site or by clicking on a link to the Booking Angel web site. The links to the Booking Angel web site may be placed in another web site, for example, web sites for "city search" type services, restaurants, newspapers and magazines; or in general search engine web sites such as YAHOO or GOOGLE. Referring now to FIG. 1. This illustrates an overview of Booking Angel processing 100. A web site for a partner web site is shown 102 as the starting point for a restaurant booking. The Internet user of this web site selects parameters for a list of possible restaurants based on location, cuisine, price, etc. The list of matching restaurants 104 is displayed to the user for selection. Each entry 106 gives information about the listed restaurant such as restaurant address and phone number. It also includes hyperlinks to additional information about the entry. For example, links to the restaurant's web site 108, to send an e-mail to the restaurant, to show a map and directions, etc. For subscribed restaurants, a link "Book a table" is available 114, which when clicked prompts the user for requested date, time, number of people, and other information 116. This data is sent to the Booking Angel system 120. The Booking Angel combines this data with information contained in a database 122 and creates a voice message 128. This voice message is used by the IVR 124 to call the selected restaurant's reservation phone number 126. The staff at the restaurant answers the phone 126 and hears the voice message 128, and is prompted to accept or refuse the booking by touching keys on the phone's keypad. The staff response is received by the Booking Angel system 120 and sends information back to the user in the form of data streams and preferences 130.

The users must be registered in order to use the Booking Angel. Registration typically is at no cost to the user. During registration, the Booking Angel will collect personal and preference data from the user and store it in a database. A registered user will be assigned a user name and a password that will be used for all bookings made by the user. The personal data collected includes contact name, phone numbers, e-mail address and booking preferences, for example the name of favourite restaurants, and parameters for booking such as time, day of week, and number in the party. The database of registered users may also be used to record an accumulation of "loyalty points" which reward users for making booking using the Booking Angel. Trend data may also be extracted from the information collected. By analysing where people are booking, the system will be able to infer the most popular restaurants in any geographical region. This can be combined with the user ratings to give an indication of the best restaurants in an area or of a particular cuisine style. By looking at individual booking trends you may be able to make suggestions of restaurants that a user is likely to enjoy.

For example trend data may show that people who visit restaurants A and B also visit restaurant C. So if an individual has already visited restaurant A and B you may be able to suggest restaurant C. The Booking Angel is a web site providing reservation services. Links to the Booking Angel are located in other web sites. For example, a web site providing "city search" type functions, e.g., locating theatres, events, clubs, as well as restaurants, would include links to the Booking Angel on web pages detailing one or more restaurants matching the search criteria.

Figure 2:
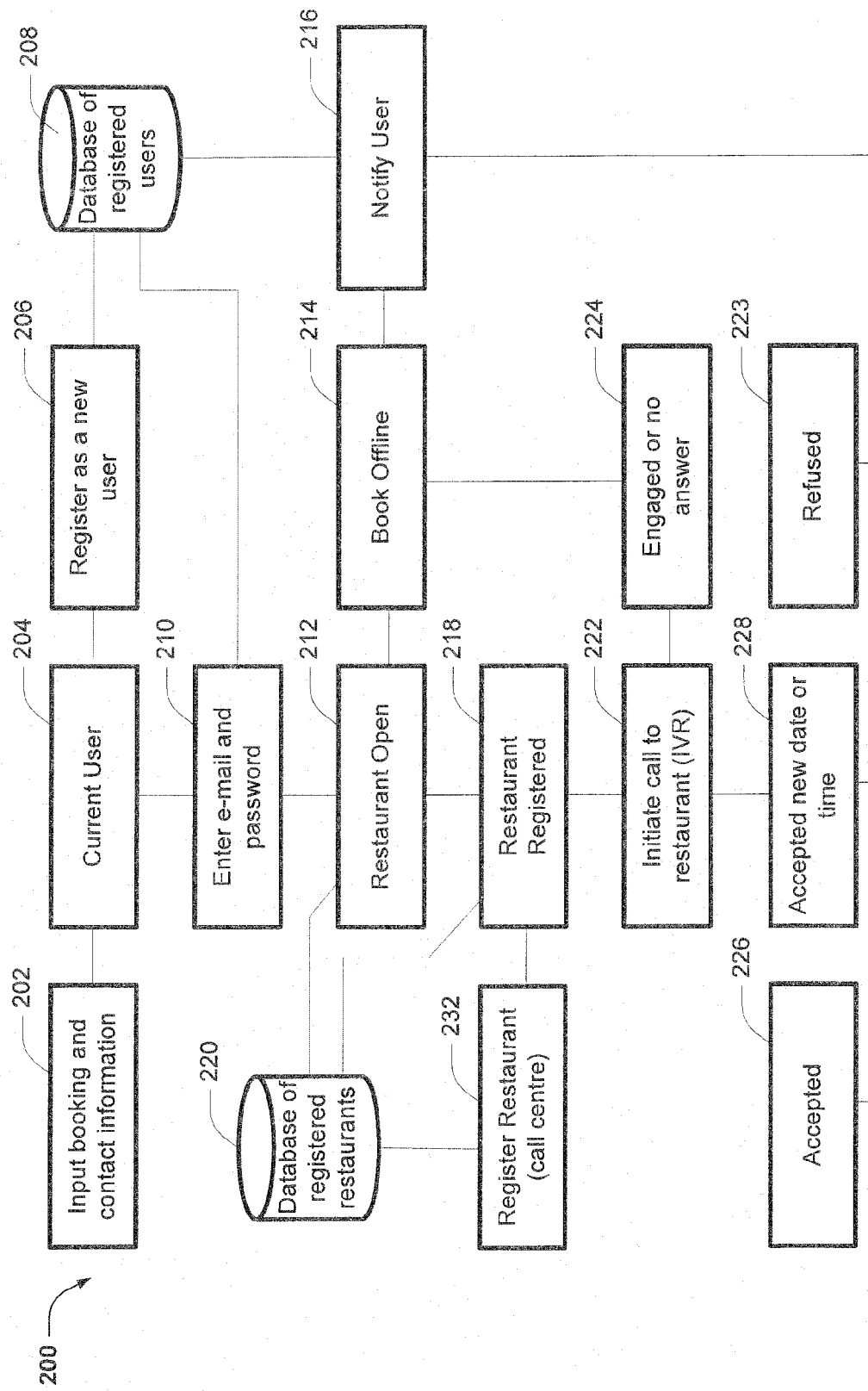
FIG. 2 illustrates the detail of the Booking Angel reservation process.

FIG. 2 illustrates the details of one embodiment of the Booking Angel 200. A user using a computer system with a web browser navigates to the Booking Angel web site and indicates a desire to make a booking at a particular restaurant. The user inputs booking and contact information 202. If the user is a current registered user 204, the e-mail address and password of the user as registered is entered. This is checked against the database of registered users 208 and if valid, information about the user is retrieved from the database 208. The database of registered restaurants 220 is checked for the times the restaurant booking telephone is available for booking requests. If the restaurant is not open for booking requests, the user is notified that an attempt will be made to make the booking offline. This is done by holding the information regarding the booking in a queue that is activated when the restaurant is open.

If the restaurant is open for bookings 212 and the restaurant is registered 218, the restaurant is called using the interactive voice response (IVR) 222. If the phone line is engaged or no answer 224, the booking request is added to the offline queue for a later attempt and the user is notified. If the phone is answered by a human operator, an IVR message containing the booking details are played and the human operator is given choices to accept, reschedule, or refuse the booking. This is done by touching keys on the telephone keypad in response to prompts from the IVR.

If the booking request is accepted 226, the user is notified 216. If the user is still online viewing the Booking Angel web page, the user is given a confirmation message. If the user is no longer online at the Booking Angel web site, the user is notified by e-mail, sms or telephone message, using contact information contained in the database of registered users 208. The details of the booking are entered into the database of registered users 208 for later processing. If the booking request is accepted with a new date or time 228, the user is notified 216 as above. If the booking request is refused, the user is notified 216 as above.

Figure 3:
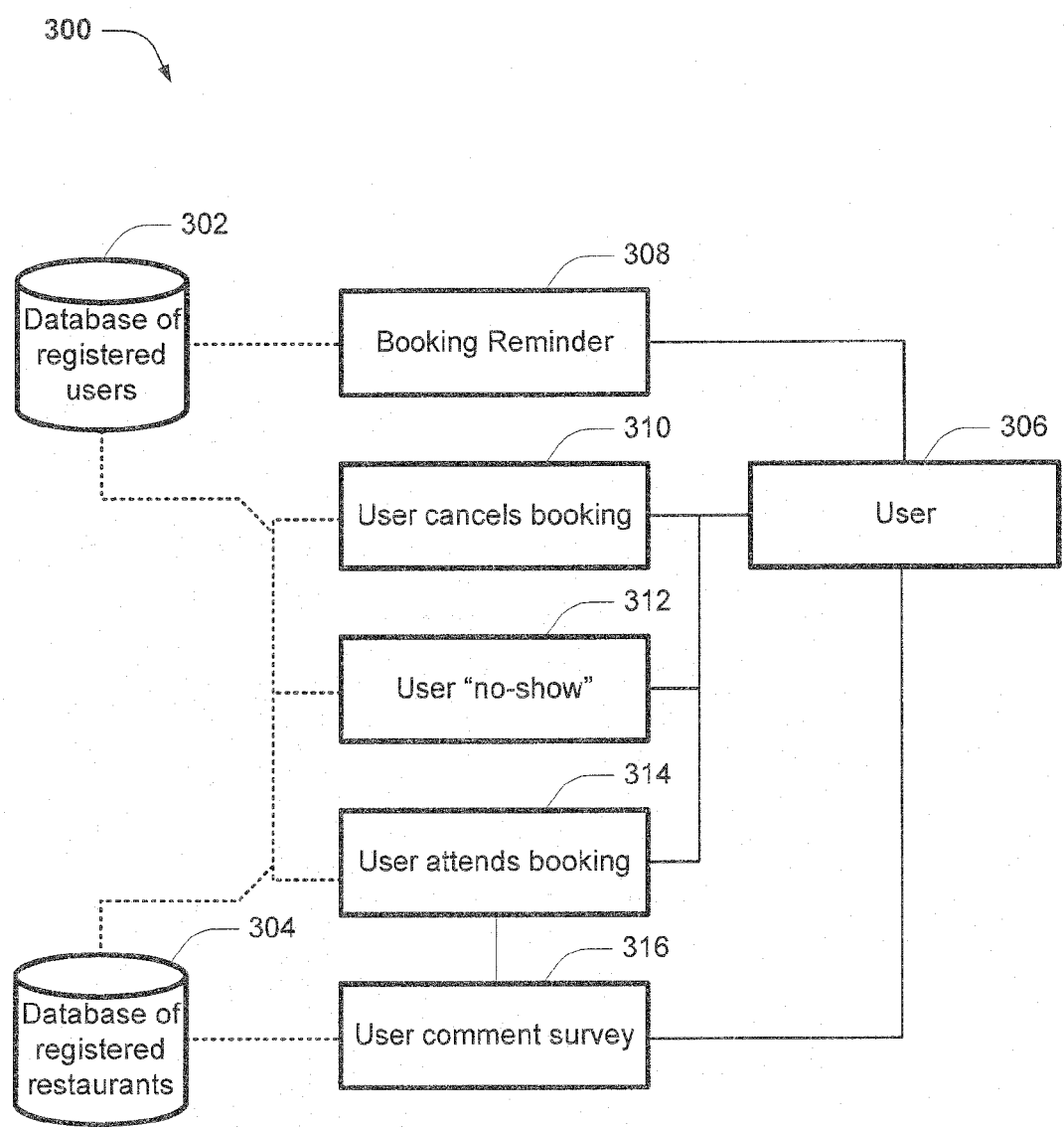
FIG. 3 illustrates the use of user and restaurant databases.

The database of registered users and the database of registered restaurants are used to record the results of the booking, calculate and award loyalty points for the user, and calculate and bill the restaurant. FIG. 3 illustrates one embodiment of these uses of the databases 300. The database of registered users 302 may be used to send the user 306 a booking reminder 308. At the time of making the booking, the user may request a reminder a number of days or hours before the booking, by e-mail or telephone message (IVR or short messaging service, SMS). The reminder requests are stored in the database of registered users and are triggered at the requested time.

The restaurant notifies the Booking Angel, for example, by phone, fax, or e-mail, of the result of the booking. If the booking was successful, that is, the user came to the restaurant at the time of the booking and ordered, then the user may earn loyalty points which are stored in the database of registered users. These loyalty points may be exchanged for goods or services according to the loyalty program details. Loyalty points may also be used in exchange for Booking Angel services, for example, expedited bookings, reminder messages, or preferential seating. The user may also be sent by e-mail a satisfaction or comment survey 316 for the restaurant. Loyalty points may be given the user when they complete the survey.

If the restaurant reports that the user failed to show for the booking 312, the user is notified and a record is made in the database of registered users. This record may be used to penalize or disqualify the offending user, for example, deducting loyalty points or refusing to permit future booking request based on a number of no-show results.

If the restaurant notifies the Booking Angel that the user has cancelled the booking, the database of registered users is updated accordingly.

Figure 4:
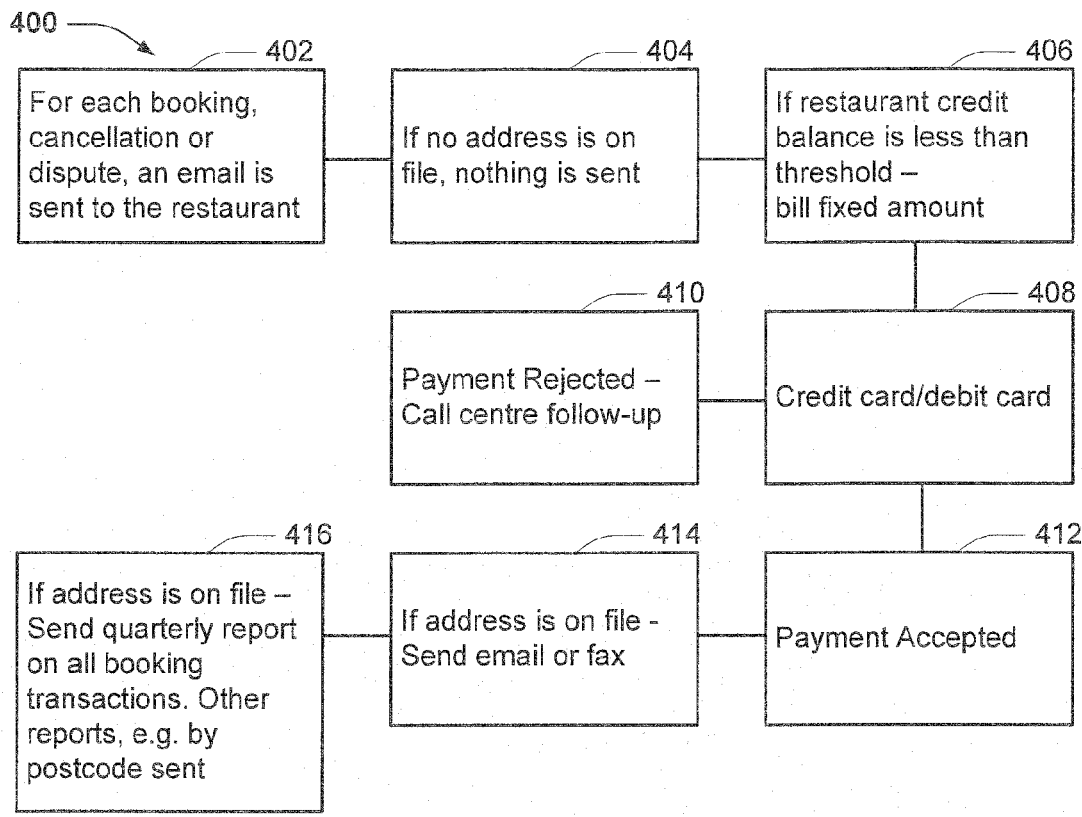
FIG. 4 illustrates the detail of one embodiment of the Booking Angel billing process.

The Booking Angel service is paid by the restaurant for each successful booking. This process is illustrated in FIG. 4. For each booking, cancellation, or dispute 402, the restaurant is notified by e-mail. If there is not e-mail address for the restaurant 404 in the database of registered restaurants, nothing is sent. If the restaurant balance is below a threshold, say $7.00, the restaurant is billed a fixed amount, say $29.50. The threshold is set by the Booking Angel and is typically the same for all registered restaurants. The fixed billing amount may be different for different restaurants. For example, a restaurant with a large number of Booking Angel bookings may wish to have a higher fixed amount. The Booking Angel bills the restaurant's credit or debit card or direct debit out of a bank account 408, the fixed amount. If the payment is rejected 410, the Booking Angel call centre will follow up with the restaurant for payment, or may remove the restaurant from the list of registered restaurants preventing future bookings. If the payment is authorized, 412, a confirmation is sent 414 by fax or e-mail, if available. Each quarter, 416, a detailed report of all booking and billing transactions is sent to the restaurant. The restaurant may also receive other reports, for example, the distribution of bookings by post code.

Figure 5:
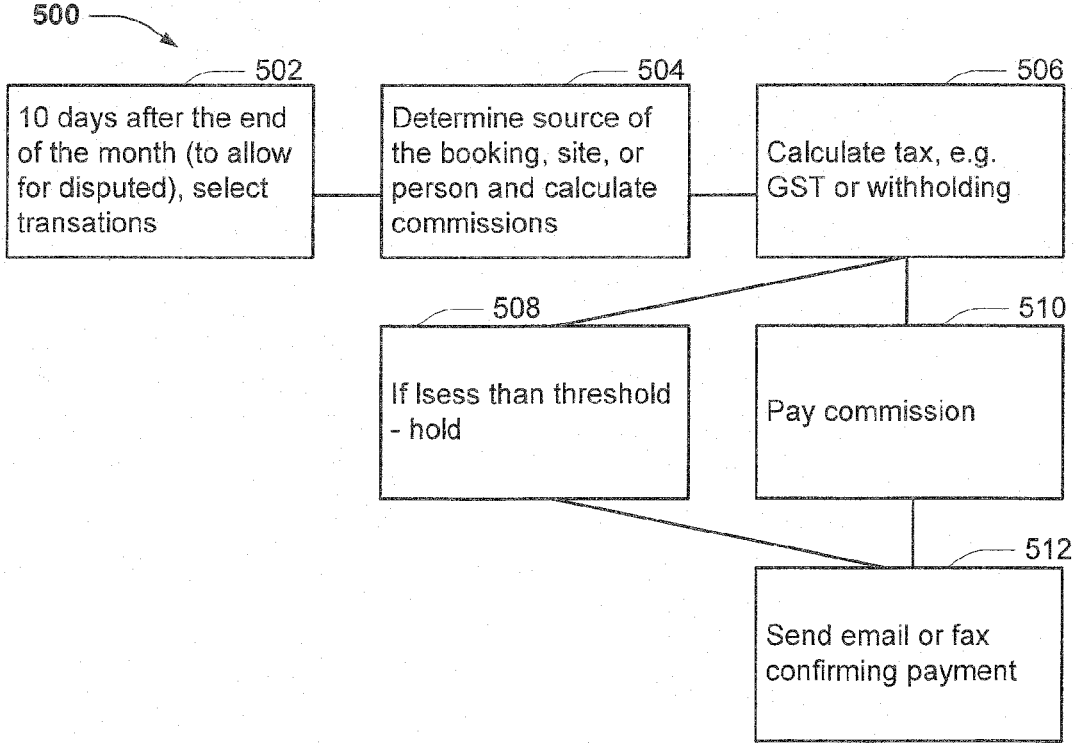
FIG. 5 illustrates the detail of one embodiment of the commission payment process.

The Booking Angel may also pay commissions for people or web sites that refer users to the Booking Angel. FIG. 5 illustrates the process of paying commissions. A fixed number of days after the end of a month, say 10 days, which allows time for disputes to be resolved, the successful bookings for the month are extracted from the database of user or restaurants 502. These transactions are examined to determine which site or person referred the user to the Booking Angel. A commission is calculated for each referring person or web site 504. Taxes on the commissions are calculated 506 and withheld or paid to the taxing authority. If the commission amount is less than a threshold, say $10, then the commissions are held until the threshold is reached 508. Commissions more then the threshold, including accumulated held amounts, are paid by a batch payment facility 510. Notification of payment is sent by e-mail to the referring person or web site 512.

Figure 6:
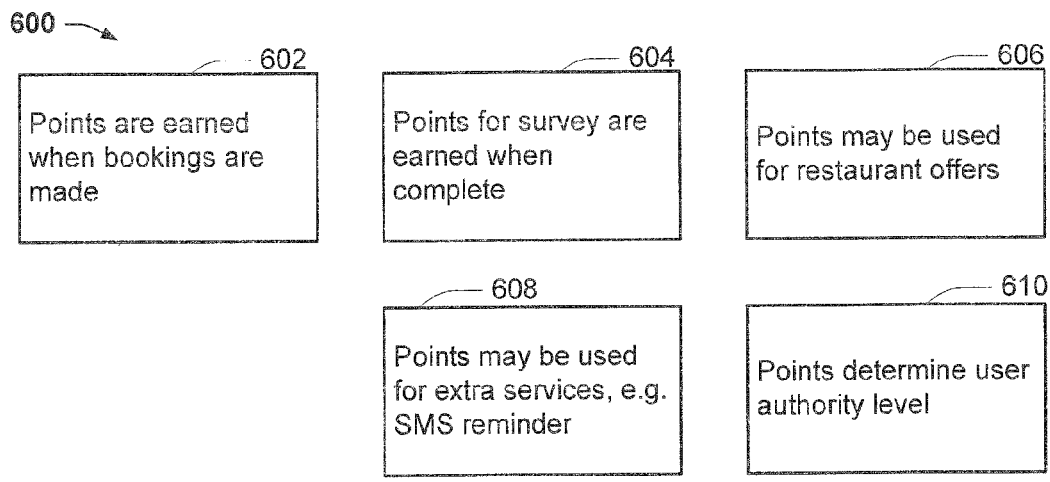
FIG. 6 illustrates the detail of one embodiment of the loyalty points process.

The Booking Angel may also award loyalty points to users. FIG. 6 illustrates one embodiment of this process. Loyalty points are earned when bookings are made 602 and are made available five days after the booked date, to allow the restaurant to report if the user kept the booking or not. If the user returns the satisfaction or comment survey, points are awarded and available immediately on receipt of the survey. A number of points may be fixed, say five points for the survey, or may vary based on criteria such as number of questions answered or comments included. The user may redeem loyalty points for goods or services at a restaurant 606. In this case, the restaurant puts together an offer and assigns a number of points needed. Points may also be used for reminder messages or other extra services 608. The number of loyalty points earned may also be used by the Booking Angel to give a user additional privilege, access, authority, or priority 610.

Figure 7:
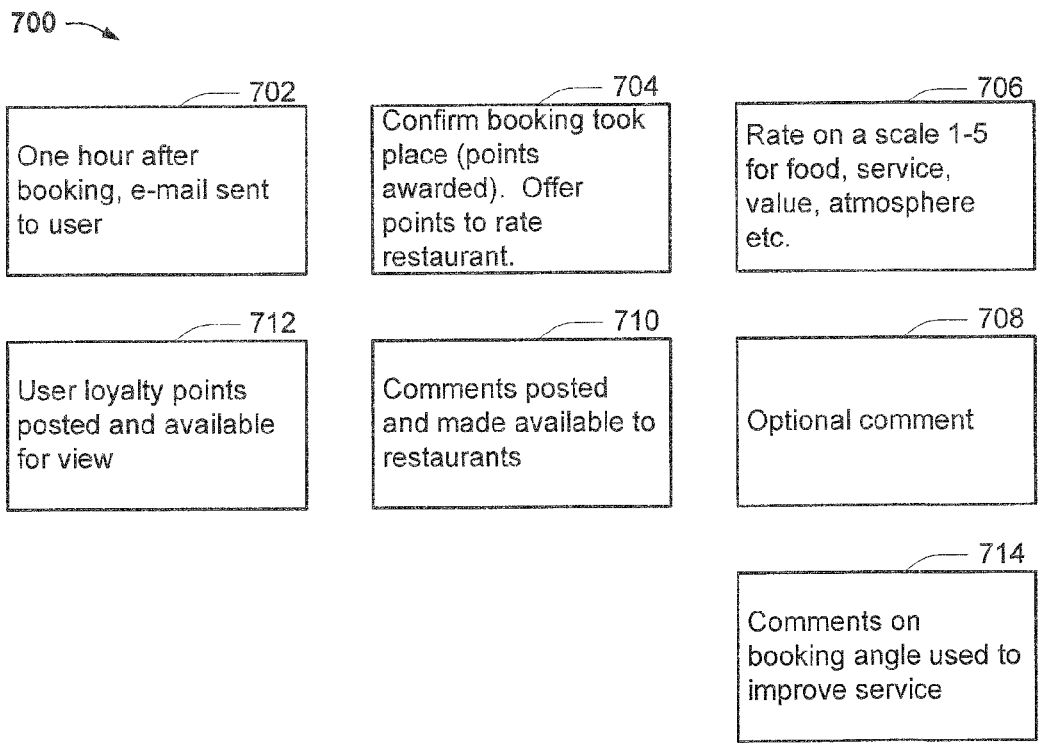
FIG. 7 illustrates the detail of one embodiment of the ratings process.

One embodiment of the use of restaurant satisfaction or comment survey is illustrated in FIG. 7. A fixed time, say 1 hour, after the booking time, an e-mail is sent to the user requesting completion of a survey 702. The user confirms that the booking took place 704, and a fixed number of loyalty points, say 25, are immediately awarded. (If the restaurant reports that the user did not appear for the booking, the loyalty points may be retracted, depending on the resolution of the dispute.) A fixed number of points, say 25, is offered for completion of the survey. The survey asks the user to rate the restaurant on a scale for categories such as "food", "service", "atmosphere", "value", etc 706. The survey includes a place to provide comments if desired 708. The comments and ratings are returned to the Booking Angel and they may be made available to the restaurants 710. The number of loyalty points for each user may be made available 712. In addition, the survey form may include comments about the Booking Angel service. These comments may be used to improve the service, or to provide testimonials on the Booking Angel web site 714.

Figure 8:
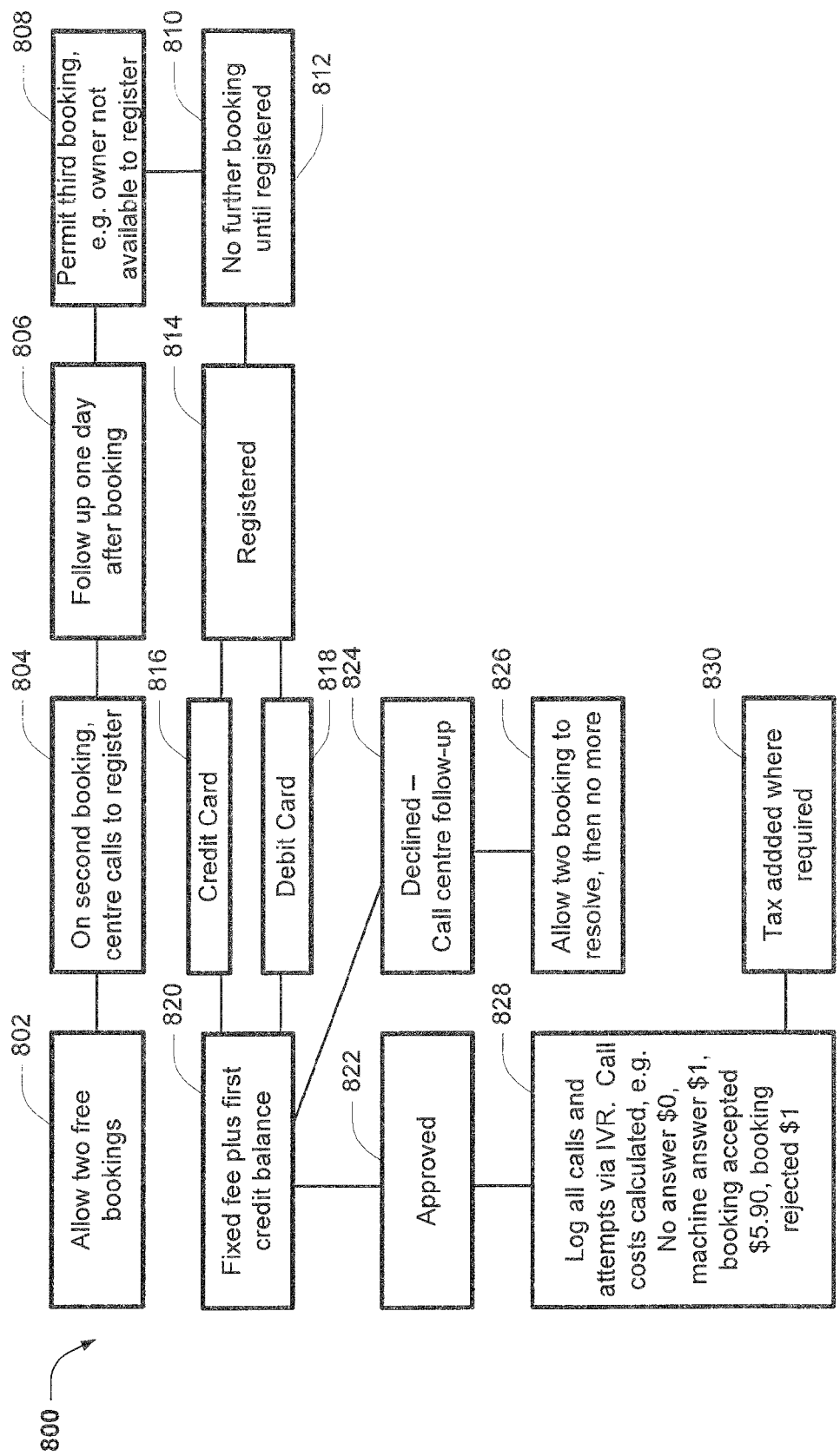
FIG. 8 illustrates the detail of one embodiment of the sign up process.

The Booking Angel is paid by the restaurants based on the number of bookings made using the Booking Angel service. Restaurants must be registered and agree to pay for each booking made. FIG. 8 illustrates one embodiment of this process. A user may request a booking at a restaurant that is not yet registered. To allow this, each restaurant is granted a fixed number, say two, free bookings 802. When a second booking is made for an unregistered restaurant 804, the Booking Angel call centre contacts the restaurant for registration and payment details 804. If unable to contact the restaurant, a follow up for the day after the booking is scheduled 806. Once the free bookings are exhausted, a last booking is allowed 808, for example to allow for the case where the owner is not available. After the last free booking is used 810, the restaurant is taken off the system until registration is complete. If the registration is not completed, or if the restaurant declines to be registered, no further actions with the restaurant is taken or allowed 812.

If the restaurant is registered, 814, they pay by credit card 816 or direct debit 818, a fixed one-time fee, say $10, and a credit balance amount, say $29.50, which is debited to pay for each successful booking. If the payment is declined, the call centre will follow up 824 and two more bookings will be permitted 826. If the payment is approved 822, the restaurant is registered and available for bookings. Each booking call is recorded and billed according to a schedule, for example, no charge for a call not answered, $1.00 for a call answered by a machine, $1.00 for a call answered and the booking is refused, $5.90 for a booking accepted. There is no charge for an incomplete call. At the end of each call, tax is added to the call charge and subtracted from the credit balance. When the credit balance is below a threshold, the restaurant credit card or direct debit is charged a fixed amount added to the credit balance.

Figure 9:
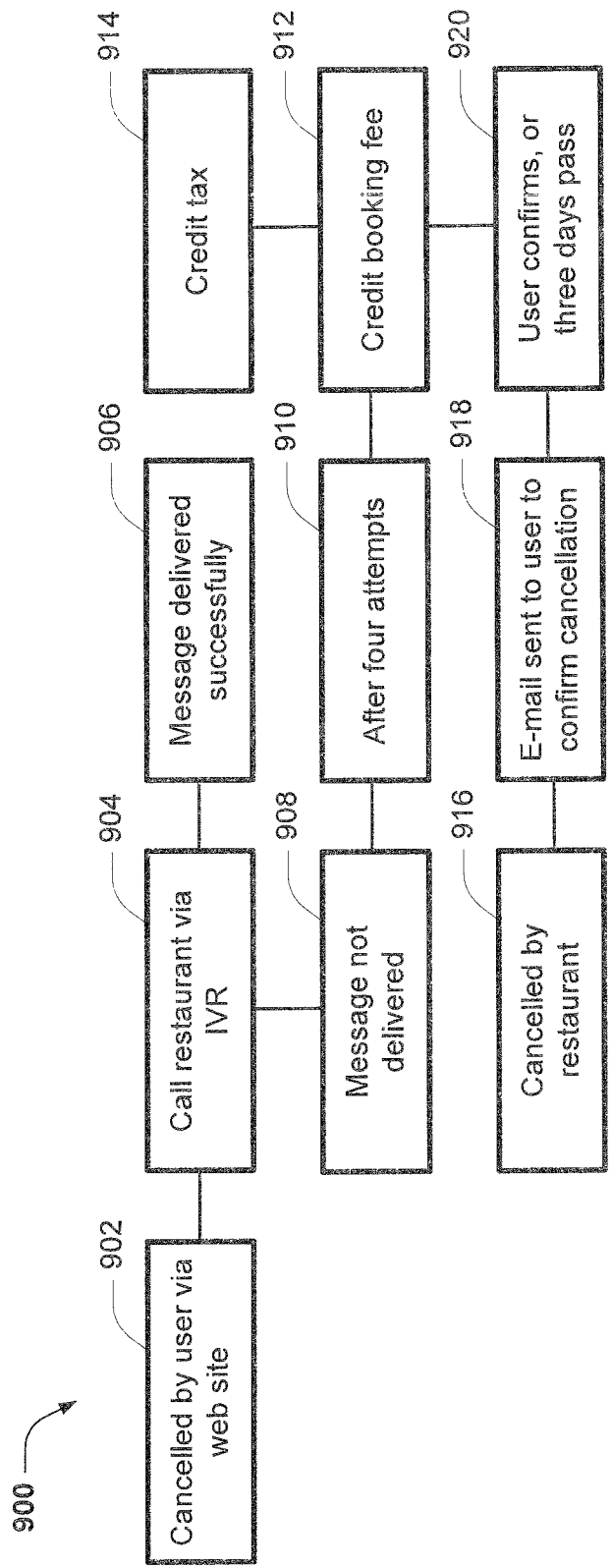
FIG. 9 illustrates the detail of one embodiment of the cancelled bookings process.

If the booking is cancelled by the user or restaurant, the restaurant is credited the amount charged for the booking. FIG. 9 illustrates one embodiment of this process. If the booking is cancelled by the user using the web site 902, the restaurant is called using the IVR 904. If successful, the amount charged for the booking, say $5.90, is credited 912, including any tax amount 914. If the IVR message was not delivered, for example, engaged or no answer 908, the call is re-queued 904. If re-queued a number of times, say four times 910, the restaurant is credited the booking fee 912 including tax 914. A record is made of the cancellation so any dispute can be resolved. If the booking is cancelled by the restaurant through the call centre 916, a confirmation e-mail is sent to the user 918. The user may confirm the cancellation or after a number of days, say three, the booking fee 912 and tax 914 are credited.

Figure 10:
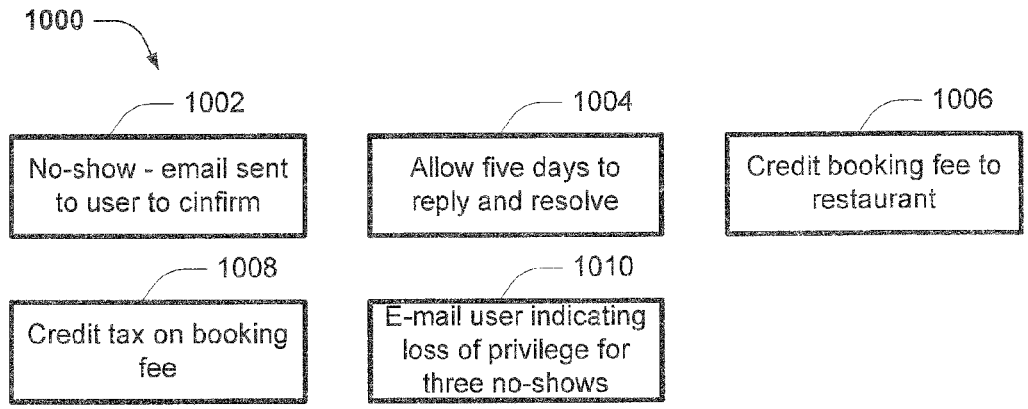
FIG. 10 illustrates the detail of one embodiment of the No-show booking process.

FIG. 10 illustrates one embodiment of a failure of the user to show up for the booking. In this case, the restaurant contacts the Booking Angel call centre or sends and e-mail 1000. The user is notified by e-mail 1002. Five days are allowed for the user to dispute the no-show status of the booking 1004. If not disputed or if disputed and resolved as no-show, the booking fee 1006 and tax 1008 are credited to the restaurant. The user is notified by e-mail 1010, including any warnings or penalties. For example, a user who is a no-show three times is prohibited from using the Booking Angel in the future, or any loyalty points given are retracted.

Figure 11:
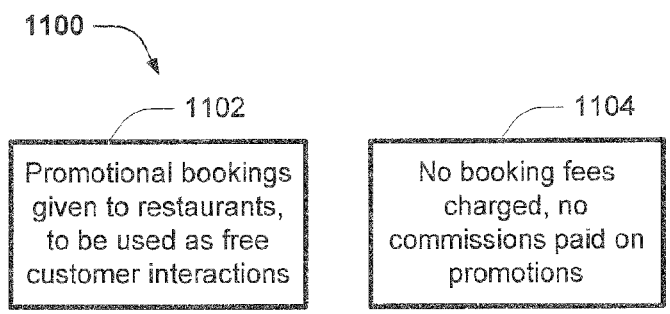
FIG. 11 illustrates the detail of one embodiment of the promotional bookings process.

The Booking Angel also allows for promotional bookings. FIG. 11 illustrates one embodiment of this process. These are credits given to restaurants as rewards for continued service, when a threshold of bookings is reached, etc. These credits are used before any charges are debited from the restaurant credit balance 1102. Promotional bookings are not included in the calculation for any commissions 1104.

Figure 12:
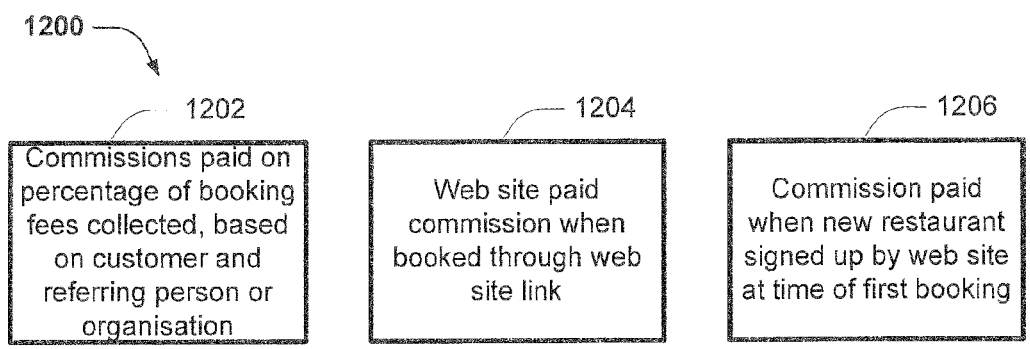
FIG. 12 illustrates the detail of one embodiment of booking commissions process.

Commissions are paid as a percentage of fees paid to the Booking Angel service. FIG. 12 illustrates one embodiment of this process. The percentage paid may vary depending on the customer or organization originating or facilitating the booking 1204. Web sites may be paid a commission for bookings made through links from their web site to the Booking Angel web site 1206. Web sites may also be paid a commission for originating or facilitating the registering of a restaurant 1204.

The Booking Angel provides a web-based, interactive booking system for the customer, and an IVR telephone interface for the restaurant. This is an advantage over current art.

In an embodiment, implementing a Booking Angel system can be made relatively easily and hassle free by a website owner.

Figures 13, 14:
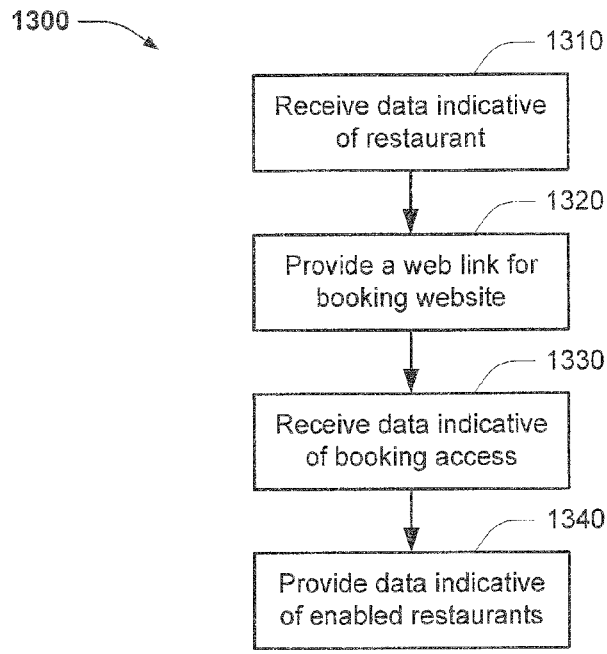
FIG. 13 is a flowchart of a method according to the present invention.
FIG. 14 is a schematic diagram of a tabular data format indicative of opening times for this restaurant.

Referring to FIG. 13, The steps involved implementing a Booking Angel system can include the following:

STEP 1310: Receiving data indicative of one or more restaurants to be enabled;

STEP 1320: Providing a web link for booking web site;

STEP 1330: Receiving data indicative of booking access; and

STEP 1340: Providing access to data indicative of active and/or inactive restaurants for enabling the web link.

Site owner typically provides Booking Angel system with data indicative of one or more restaurants to be activated. Data indicative of a restaurant to be activated can include: restaurant name, restaurant address, restaurant phone number. More details can be provided if available, including website URL, contact name, restaurant website URL, restaurant email address, restaurant fax, restaurant opening hours etc. Preferably, the data format is 'csv' or other standardised tabular format. Opening hours can be provided in separate fields that can be queried by a database. Appropriate hours for calling a restaurant can also useful, particularly if these times are different form their opening hours. Typically, fast food chains and restaurants known to not take reservations are excluded.

By way of example, Restaurant A may be open for breakfast on weekends, lunch Monday through Friday and dinner every night except Monday. A tabular data format 1400 indicative of opening times for this restaurant can be represented as best shown in FIG. 14. Alternatively, if opening hours are not provided it may be inferred that the restaurant is open for lunch and dinner every day.

Site owner can further provide data indicative of which restaurants have an existing billing relationship with the website.

A restaurants can be activated within the booking angel systems and a web link provided for bookings. The web can be provided in a format that a web site developers can include in a web page, wherever a link may be required. A calendar widget or other suitable way of linking to a booking page can be developed. A branded reserve now button or calendar can be developed and provided to fit in with the look and feel of a respective web site.

In this example a link can be identified by the restaurants telephone number including country code and area code, whereby a restaurant in America with the phone number (310) 456 7890 may have a book now link in the form of:

"service.bookingangel.com/book/restaurants/referralID=?/supplier=13104567890"

Receiving data indicative of booking access can be achieved by using a tracking '.gif' image file and/or asynchronous JavaScript. This can be implemented on each page where the booking link appears, to enable monitoring of click through rates for maximize/improve the number of bookings. The '.gif' image file can also have a link identifier related to the phone number. To reduce any effect of caching the link identifier may further include a number indicative of date and/or time. By way of example only, a '.gif' image file link identifier can include:

"getimage.php/1/13104567890/20080109".

In an embodiment, after receiving data indicative of one or more restaurants, and enabling the restaurants within the booking system, access can be provided to data indicative of activated restaurants. By way of example only, an xml feed of phone numbers of all the restaurants activated within the booking system can be provided. This xml feed or web service can further comprise variables associated with each phone number, including an one or more of signed, active, and/or inactive. A website developers can set up a process for updating the data at regular interval, preferably at least every 24 hours or more preferably as often as practical. Based in the content of this feed, selected booking links can be activated and inactivated for particular restaurants. Typically the web server IP addresses is required to enable access to the feed.

In an embodiment, signed up restaurants can be given priority over other restaurants. It will be appreciated that signed up restaurants can provide direct commission upon each booking.

It will be appreciated that a trial booking system can be implemented and tested on a staging environment to confirm the updating process is operating correctly and that the integration is acceptable.

In an embodiment, customized branding can also be provided. A Booking Angel system is typically branded with "BookingAngel.com". Booking Angel can further provide customized branding can across various areas of the restaurant web site.

In an embodiment, confirmation emails sent to users and/or restaurants are sent from a Booking Angel system. Co-branding can also be included in these emails. The e-mails sent by a Booking Angel system may further include cross-promotional advertising material.

In an embodiment, when a booking angel system server makes an outbound call to a restaurant and receives an answering machine, it leaves a message advising the restaurant that someone has attempted to make a reservation and to call back on a specific phone number to retrieve the information. When the restaurant calls Booking Angel the reservation request is relayed to the restaurant for their acceptance and or rejections. A customized number can also be setup with various options branded with details of a web site company, but managed by Booking Angel.

In an embodiment, a centralised call centre can be operated—24 hours a day and 7 days a week. This call centre can provide support to restaurants receiving calls that hang up on a call or opt to speak to a live agent. The agents can be setup to answer the phone and to capture information from the restaurant. This can involve a setup fee, a monthly fee and/or a per minute per call fee. Some customization of a call script can also be made.

In an embodiment, a booking angel system can further provide administration web pages. Restaurant can access and update their profile, including opening hours, contact details, special notes etc.

In an embodiment, a booking angel system server can also authenticate new "sign-ups" to a listing sits. When a restaurants claim (or registers) a new listing, the booking angel system server can be provided (or informed of) the restaurants details and include validation step that automatically call the restaurant phone number provided to validate the phone number matched the restaurant. When a restaurants initiates a listing in a web site or updates a profile, the booking angel system server can process the data by automatically calling the restaurants phone number provided to confirm details.

In an embodiment, a booking angel system can be integrated with a customer relationship management system. By way of example only, the booking angel system can be integrated with Sales force. Access to the management system can be organized by customized logins for each agent, IP address or via email. By integrating with particular phone numbers, hot leads can be delivered and restaurants can be immediately signed up upon receiving a booking.

In an embodiment, a booking angel system can provide an automated marketing system. This system can send auto responders to restaurants upon the occurrence of particular events, including a first reservation, a third reservation in certain areas etc.

In an embodiment, a booking angel system can provides an API development for reporting, billing or integration with existing systems.

Referring to FIG. 15, an embodiment implementation of an online XML schema 1500 can be integrated with a website directory. A website can download the XML feed (or schema) of restaurants that are enabled and matching the XML records with listings in their website (typically based upon phone number) and using the appropriate reservation web link. This step of matching and selecting links enable the directory to directly 'monetize' (or derive income) from a directory listings website through commissions' earned and leads closed.

The example XML schema 1500, includes:
Field 'signed' 1502—wherein when 'signed' is assigned true, the restaurant is either a registered or on a 30 day free trial. Preferably a credit card has been validated;
Field 'display' 1504—wherein when 'display' is assigned true, the booking link should be displayed with a booking option. It will be appreciated that web links can be displayed for restaurants that are not signed up;
Field 'bookinglink' 1506—includes a copy of an allocated link to the booking page for a respective restaurant;
Field 'imagelink' 1508—includes a copy of a link to an allocated image for displaying on a respective restaurants web page to track the click through rate of bookings; and
Field 'primary' 1510a and 1510b—enables setting a contact as a nominated primary contact (identified by 'true' 1510b).

In an embodiment, a plurality of links to respective XML schema can be provided or published. Access to any XML schema can be restricted to on the basis of the IP address of the requesting server. It will be appreciated that a plurality of XML schemas can be published.

By way of example, it is possible to access restaurant data by an XML schema by any combination of country, state and time since you last fetched the xml data. For example:

http://service.bookingangel.com/tools/restaurants.php/date/20080212 can provide access to an XML file incorporating any changes since the date specified YYYYMMDD;

http://service.bookingangel.com/tools/restaurants.php/country/Australia can provide access to an XML file incorporating all restaurants from a specific country, such as Australia;

http://service.bookingangel.com/tools/restaurants.php/country/Australia/state/New+South+Wales can provide access to an XML file incorporating all restaurants from a specific region, such as Australia—New South Wales http://service.bookingangel.com/tools/restaurants.php/unzip/true can provide access to an XML file rather than a ZIP file.

In an embodiment, by way of example only, an initial import (or manual download) of an XML schema, the file can be reconciled automatically or manually with business rules associated with the web site. An automatic process can fetch updates to the XML data.

It will be appreciated that dates and times associated with the XML feed can be server local time, for example are Australian Eastern Standard Time. If accessing a 'change' file, any record accessed has been amended in some way. Local rules can be implemented to update the site database with more up-to-date data. It is preferably that a site updates whether the restaurant should be displayed based upon the <Display> XML Tag, or possibly promoted based on a <signed=true> tag (indicating as these restaurants can directly earn income of the site).

In an embodiment, by way of example only, a web service can also be provided. For example, "http://service.bookingangel.com/ws/RestaurantList.php?WSDL". This has the following public method available: public function getRestaurants(country, state, lastRetrievedTime). Wherein, @param string country is the full name of the country, @param string state is the full name of the state, @param string lastRetrievedTime is an SQL compatible date time and @return Restaurant[ ] is an array of objects. Each Restaurant object can be defined as having: @var string name, @var string phone, @var string phoneAreaCode, @var string phoneCountryCode, @var string email, @var string website, @var boolean signed, @var boolean display, @var string bookingLink, @var string imageLink, @var RestaurantContact[ ] contacts, @var RestaurantAddress[ ] addresses. Wherein RestaurantAddress is an array of objects, each comprising: @var string streetAddress, @var string suburb, @var string state, @var string country, @var string postcode. Wherein, RestaurantContact is an array of objects, each comprising: @var string type, @var boolean primary, @var string firstName, @var string lastName.

Figure 16A:
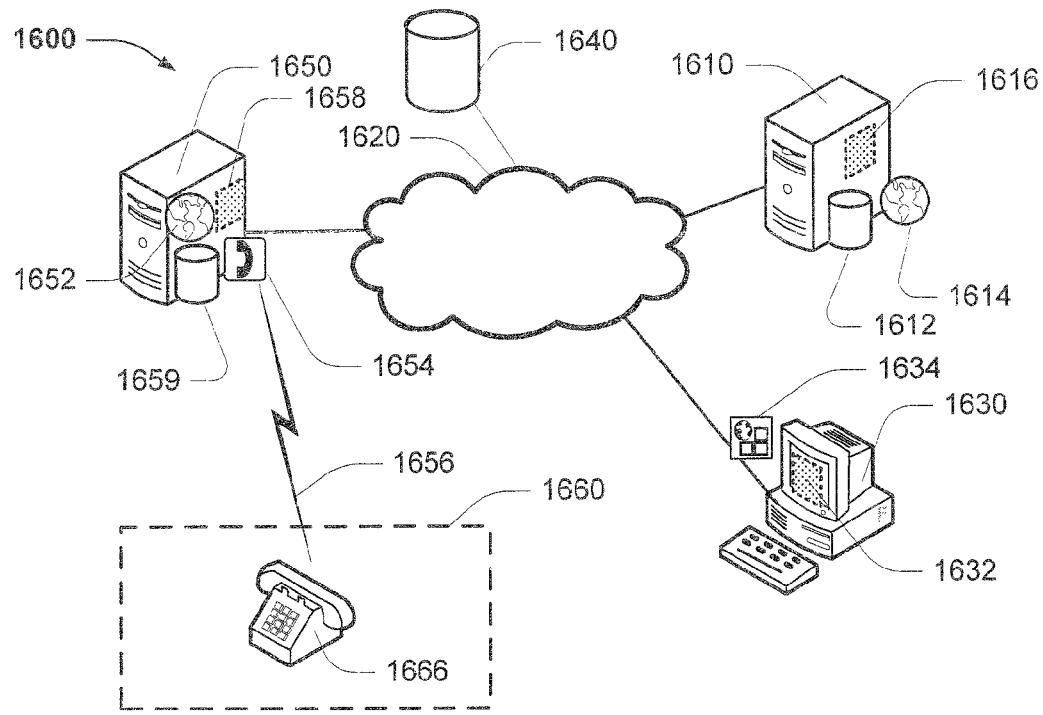
FIG. 16A is a schematic view of a system according to the present invention.

Referring to FIG. 16A, a system 1600 can comprise a first server 1610 including a storage device 1612, a web server 1614 for publishing pages having details of one or more venues, and first program module 1616 for providing access to an online booking. The server is coupled to a data network 1620. It will be appreciated that the first server 1610 can be a distributed computing device.

A client 1630 is coupled to the data network 1620 and is adapted to execute a web browser program 1632 for requesting and displaying a web page 1634. By way of example, access to an online booking is provided via the client displayed web page 1634.

In an embodiment, the program module can query an a data store 1612 comprising data records indicative of venues, query an external database 1640 comprising data records indicative of venues. Online booking can be accessed by way of a predetermined web link, or an associatable web application (or applet). The web server (or automatic process) can use the first program module 1616 to pre-parse and update web pages, or dynamically parse and update web pages at publication of the page.

In an embodiment, the first candidate reference to the first venue is a telephone number including area code or reference ID, wherein the first candidate reference is maintained within an accessible dataset (or database). If the first data record is obtained, the web-page is updated automatically and/or dynamically to have a first web-link associated with the first venue for requesting a reservation.

In an alternative embodiment, as a client 1630 web browser program 1632 fetches a web page 1634, the first program module 1616 is operative associated with the published page to dynamically providing access to an online booking as the page is rendered at a client. Upon fetching a page, the first program module 1616 parses the page for candidate references to venues (e.g. phone numbers) and then queries a database to retrieve relevant data records indicative of the venue. Upon confirmation that a candidate reference is a venue to be displayed, the first program module 1616 can display a booking link in place of the respective reference. The booking link can be accessed by way of a predetermined web link, or an associatable web application (or applet).

In an embodiment, access to an online booking can be provided via the client displayed web page 1634 by accessing a web link to a predetermined booking page. This booking page can be published by the web server 1614, or more preferably by a remote booking server 1650 via a respective web server 1651. Alternatively, the displayed web page 1634 can be operatively associated with a web application (or applet) that enables the user to directly enter booking details. The web application receives data indicative of the booking details and transmits the data (via a data network) to the booking server 1650.

In an embodiment, the booking server 1650 is adapted to receive data indicative of a requested booking. An interactive voice response (IVR) module 1654 used to communicate 1656 with a venue 1660 via a telephone 1666 to arrange (or confirm) a booking. Upon acceptance (or rejection) of the booking request, the client is advised. Typically the client is advised via email or telephone.

By way of example, the booking server 1650 can calculate 1658 and store 1659 analytic data associated with each booking.

Figure 16B:
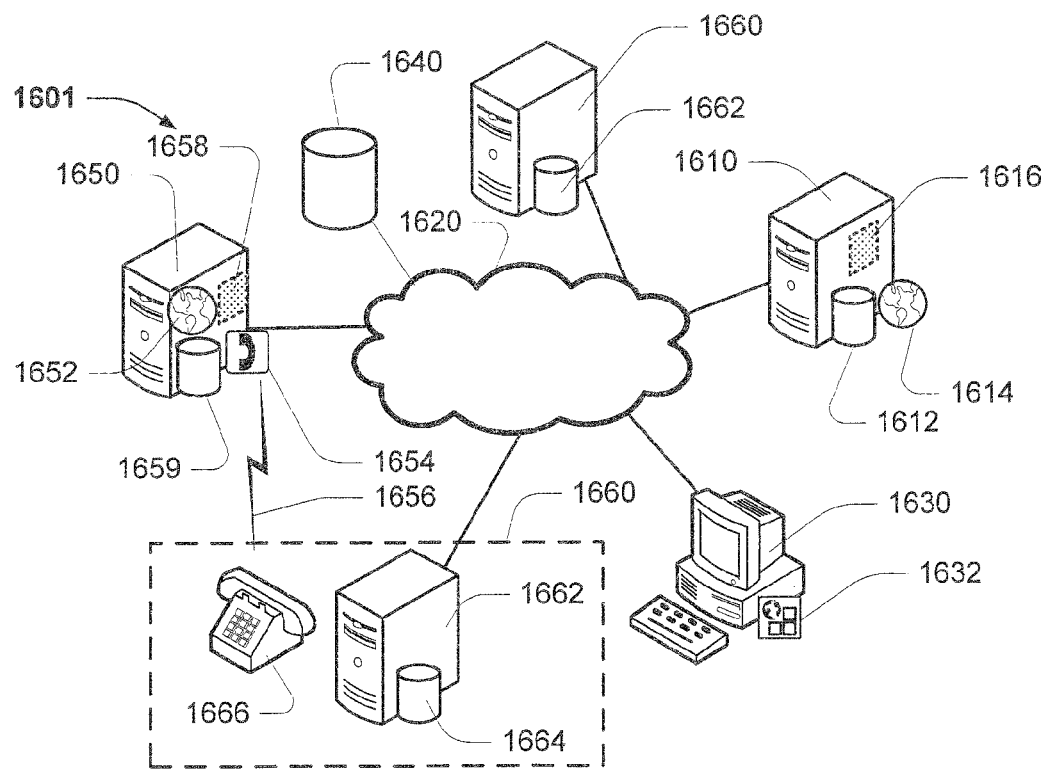
FIG. 16B is a schematic view of a system according to the present invention.

Referring to FIG. 16B, a customer relationship management (CRM) server 1660 can be coupled to the data network 1662. The booking server 1650 can provide analytic data to the customer relationship management server 1660 for managing and nurturing interactions between venues and/or clients in respect of sales and marketing prospects. In this example, a venue can include a computer 1652 to retrieving analytic data or interacting with the customer relationship management server 1660.

Referring to FIG. 17, by way of example only, first program module 1616 can include a java script applet 1710.

In an embodiment, by way of example only, a dynamic implementation can be employed. A code module operating in conjunction within the web page (for example Javascript or other forms of DHTML). In this example, the website associates (or inserts) a code module with (or within) a published web page. The code module can be executed in conjunction with publishing the web page or by the browser when displaying the web page. As this example code module is associated with the publication or presentation of a web page, it can also be used in calculating or collecting real time analytic data from one or more websites. This real time data can be further used to deliver sales leads, validate user reviews and infer user preferences.

It will be appreciated that, integration of the system is made relatively easier for a website owner (or developer) by associating a code module with a web page publication, thereby enabling reservations to be booked online via a centralised IVR system. Dynamic integration also facilitates up-to-date information being presented.

By integrating an applet with a published web page, an identified and enabled link can initiate execution of the applet to receive and/or collect booking information data from within the website. The collected booking data can be sent to a centralised IVR enabled booking system. It will be appreciated that this web page presentation provides and online reservation system via It will be appreciated that this can provide a method and systems for monetizing business listings on the internet. Secondary benefits can include:

The systems allows integration between the website listing and restaurant without the website or restaurant requiring additional equipment;

the system may be used to deliver reservations to businesses for used as leads in the sales process;

preferences on bookings can be inferred, for example if you like A you probably like B and/or C;

validated ratings and/or review can be obtained from a person (who is verified to have been to a venue) after they have visited a particular venue.

It will be appreciated that many of the benefits are further accentuated by the system centralising booking functions across a plurality of websites or web based internet directories. Further, by being accessible to a plurality of websites or web based internet directories, more reservations and validated ratings can be processed.

It will be appreciated that the disclosed system can be used for booking reservation and order items at or from venues.

Figure 18:
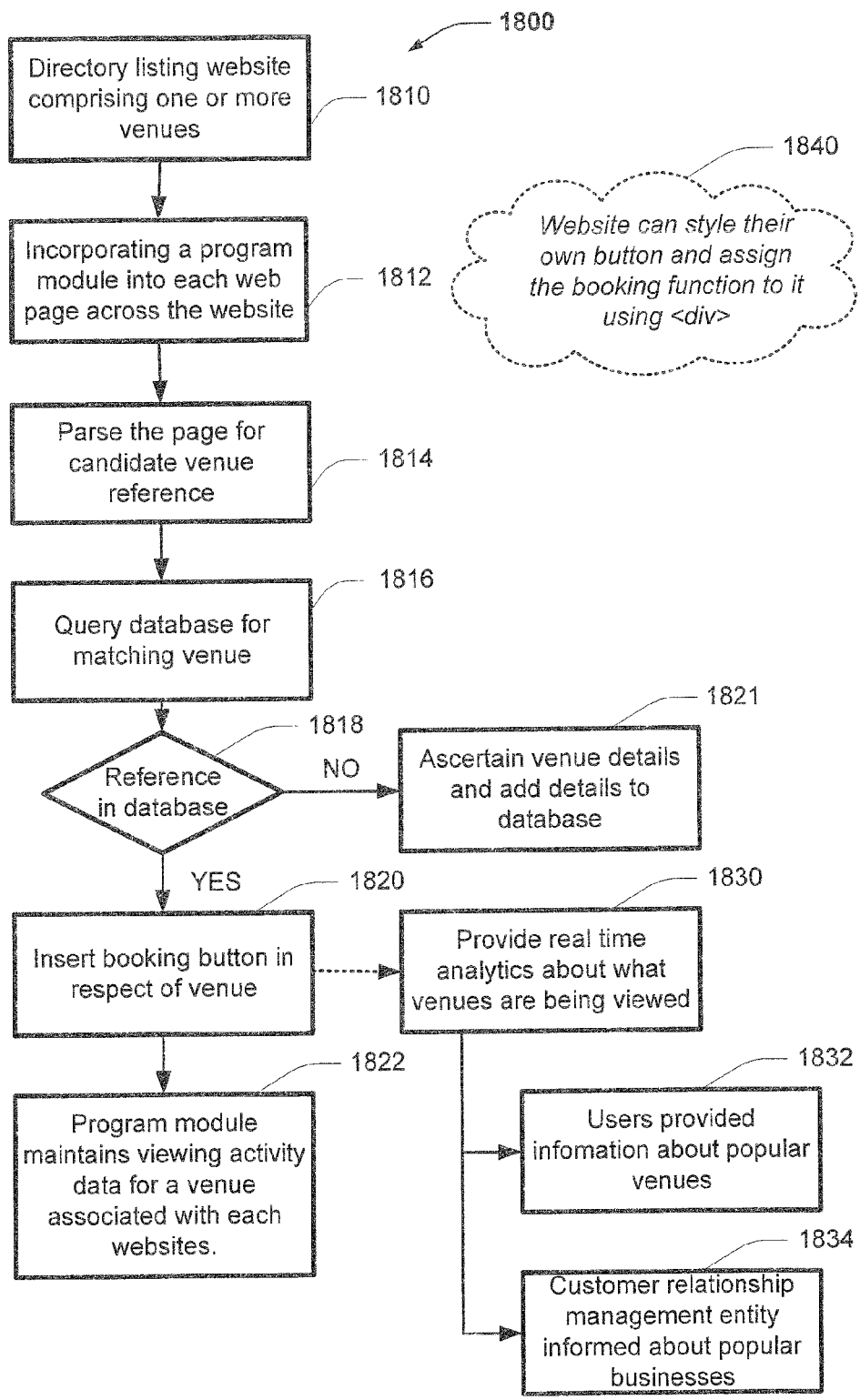
FIG. 18 is an embodiment flowchart for a method to the present invention.

FIG. 18 shows an embodiment flowchart for a method 1800 of integrating a booking system to a web site. This method comprises the steps of:

STEP 1810—Presenting a directory listing website comprising one or more venues for generate additional revenue by enabling users to make bookings online;

STEP 1812—Incorporating a first program module into each web page across the website;

STEP 1814—parsing the page, by the first program module, for candidate venue references (such as venue names and/or phone numbers)—typically the first program module parsed the page as it is rendered at the client.

STEP 1816—Query database for matching candidate venue references with active venue;

STEP 1820—If reference is in the database, insert booking button in respect of venue into the rendered web page;

STEP 1821—If reference is not in the database, ascertain venue details and add details to database (this can be performed offline);

STEP 1822—Preferably, program module maintains viewing activity data for a venue associated with each websites;

STEP 1830—Preferably, program module enables Providing of real time analytics about what venues are being viewed;

STEP 1832—Preferably, real time analytics includes providing users with information about popular venues;

STEP 1834—Preferably, real time analytics includes providing a customer relationship management entity with data about popular venues.

It will be appreciated that a website, blog and/or directory style website which lists venue (or business) information— for example like Citysearch.com or YellowPages.com can enable an online booking/reservation functionality Already having business names, addresses and phone numbers listed on the site, in order for them to enable a booking system on their site, a first program module 1616 in the form of java script applet can be incorporated into each web page across the site. This java script code parses the page to identify candidate phone numbers. These candidate phone numbers are matched against numbers enabled within the booking system as accepting reservations. This can be achieved by querying a database for matches against one or more candidate phone numbers. The JavaScript is adapted to, upon confirming a match, displaying a "book now" button (or link) on the page next to (or over) the phone number. An API's can be provided to customising integration of the website with the booking system.

It will be appreciated that billing arrangements associated with each venue can be maintained within the database. A venue may be associated with many billing arrangements. For example, a venue may have a billing relationship with one or more web sites and/or the billing server.

Alternatively, the venue may have no current (or recorded) billing arrangement. These venues may be entered into the billing system by obtaining (or maintaining) a listing of all known venues within a class. These venues can be confirmed upon entry into the system or upon first direct exposure to the booking system. The class of venue may also be recorded such that upon display of booking information, a different booking form may be displayed.

Figure 19:
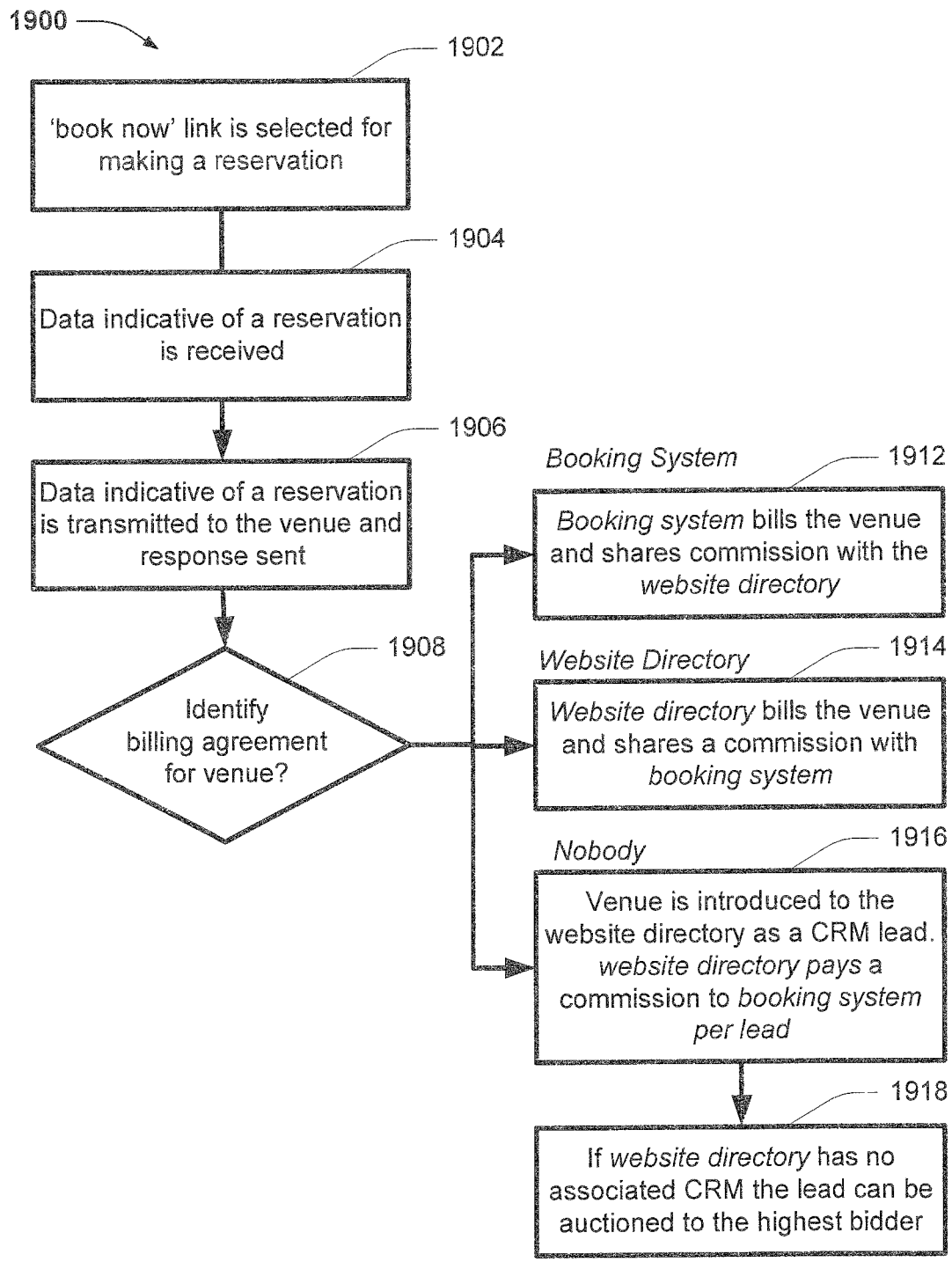
FIG. 19 is an embodiment flowchart for a method to the present invention.
Figure 20:
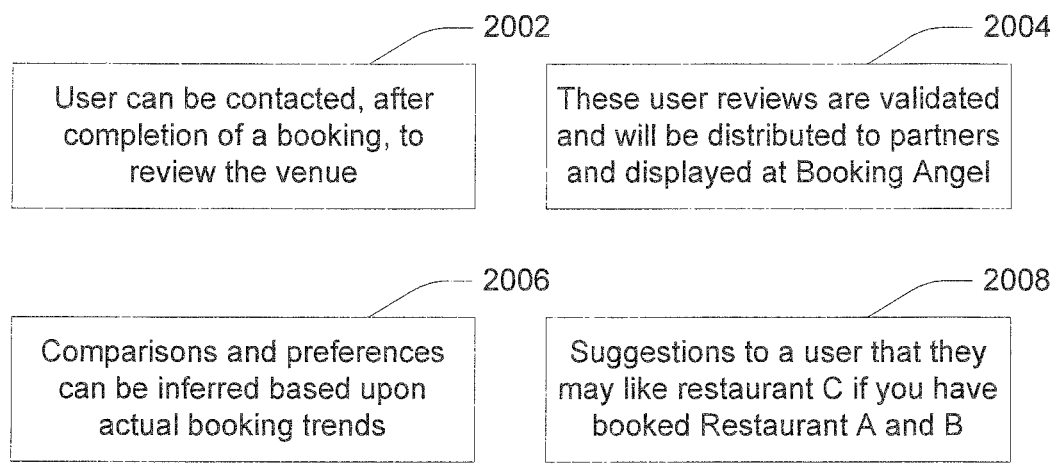
FIG. 20 illustrates the detail of an embodiment of the present invention.

FIG. 19 shows an embodiment flowchart for a method 1900 of taking a booking and receiving a commission. This method comprises the steps of:

STEP 1902—'book now' link is selected for making a reservation;

STEP 1904—Data indicative of a reservation is received from a user;

STEP 1906—Data indicative of a reservation is transmitted to the venue and response sent to user (typically via email). Confirmation may also be sent to the venue;

STEP 1908—Identify billing agreement for venue?

STEP 1912—If billing agreement for venue is with a booking system, the booking system can bill the venue and shares commission with the website directory;

STEP 1914—If billing agreement for venue is with a web directory, the website directory can bill the venue and shares a commission with booking system STEP 1916—If billing agreement for venue is not with either the booking system or web directory, the venue can be introduced to the website directory as a CRM lead. Preferably, the website directory pays a commission to the booking system per lead. If website directory has no associated CRM the lead can be auctioned to the highest bidder.

It will be appreciated that a user navigating to a web page can select (click on) a book now button, which without opening a new browser window, displays a booking form, thereby enabling the user to stay at the original website. The booking form can allowing the user to select a desired time, date, number of people and any other booking preferences. This information can then be transmitted by an Application Programming Interface (API) via a data network to the booking server. The booking server received the data indicative of a booking details and employs an Interactive Voice Response System (IVR) to call the desired venue, deliver the reservation details and receive a acceptance/rejection to the reservation via pressing keys on their phone or speech recognition. The user who made the reservation request can then informed of the reservation outcome via email or SMS.

It will be appreciated that benefits to the website can include any one of the following:

Website owners can implement and provide the users of their website the feature of online reservations at any business in the world with a telephone, without implementing a private IVR system and/or online reservation system.

Website owners are not required to understand IVR system and/or online reservation system.

Website owners may receive revenue from each reservation that is made, by way of commission sharing with the owners/operators of the booking server.

Website owners may also use the reservation as a lead. For example if a booking request is selected from a website where there is no existing billing arrangement between the website and the venue. For such venues, when a user requests a reservation. The business receives a phone call and can be told the reservation came from a particular website, and a booking request can be made as set out herein. As there is no existing relationship between the website and the venue, the "lead" is valuable to the website and can be billed for each lead. At a later time, a sales person for the website can be passed the lead for contacting the venue. Using this reservation as proof the website suitability, the salesperson will be able to bring value to that particular venue.

Some venue listing within the billing system can have an existing billing relationship with the billing system, whereby the venue can be charged for each reservation. This commission can be shared with the website.

Some venues have a billing relationship with the website, whereby the booking server may pay a commission for bringing us a new user, or the booking server may share the commission received by the website.

A user who made the reservation can be contacted after the reservation, to obtain feedback on the venue 2002. This can be used to validate a review. The user reviews are validated and can be distributed to partners and displayed by the hooking server (e.g. 2004).

Comparisons and preferences can be inferred based upon actual booking trends 2006.

Preference information for a websites can be provided about trends in bookings, for example that a user who liked restaurant A also liked restaurant B or C 2008.

It will be appreciated that the disclosed method enables owners of a websites to monetize their local listings by implementing online bookings, reservations or orders using an interactive voice recognition (IVR) system.

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

I claim:

1. A method for enabling a user of a web-site to make a reservation request, for the benefit of the user;
   wherein the web-site is stored on a computer usable non-transient storage medium by a web-server;
   wherein the method is performed by a processor apparatus, the processor apparatus is coupled to the web-server, and the processor apparatus is coupled to a database having a plurality of data records each indicative of a respective one of a plurality of registered venues;
   the method comprising the steps of:
   (a) accessing the web-site from the web-server, the web site including a first web page, the first web page comprises a first reference data indicative of a reservation telephone number of a first venue, the first web page further incorporates a code module;
   (b) receiving the first web page;
   (c) executing the code module incorporated within the web page comprising the first reference data, the code module identifying the first reference data indicative of a reservation telephone number of the first venue;
   (d) upon identifying the first reference data indicative of a reservation telephone number comprised within the web-page, the code module incorporated within the web page querying the database using the first reference data indicative of a reservation telephone number for confirming if the first venue is one of the plurality of registered venues having a respective first data record;
   (e) if the first venue is one of the plurality of registered venues, the code module incorporated within the web page obtaining the first data record indicative of the first venue, the first data record including data indicative of a first web-link for accessing a remote booking server to make a reservation request with the first venue using an interactive voice response facility;
   (f) if the first venue is one of the plurality of registered venues and the first data record is obtained, the code module incorporated within the web page modifying the web-page content of the first reference data by operatively associating the first reference data indicative of a reservation telephone number with a hyperlink of the first web-link for enabling a reservation request to be made with the first venue using an interactive voice response facility;
   (g) if the first venue is one of the plurality of registered venues and the first data record is obtained, upon modification of the web page, when the hyperlink of the first web-link is selected by the user, prompting the user for reservation data indicative of a reservation request at the first venue, the reservation data including a user specified time and a user specified date;
   (h) if the first venue is one of the plurality of registered venues and the first data record is obtained, upon modification of the web page and receipt of the reservation date, transmitting the reservation data to the remote booking server that is coupled to interactive voice response facility; and
   wherein the booking server is adapted to retrieve contact information of the first venue, create a voice message from the reservation data and contact information, the voice message indicative of the reservation request, enabling transmission of the voice message via the interactive voice response facility for communicating the voice message to an operator at the venue, receiving from the operator acceptance or rejection of the request, and informing the user of the operator acceptance or rejection.

2. The method according to claim 1, wherein the remote booking server is adapted to perform the steps of:
   (a) combining the reservation data with venue information from a booking database;
   (b) creating a voice message from reservation data and venue information, the voice message indicative of the reservation request including preferences;
   (c) transmitting the voice message by calling the business using an interactive voice response facility coupled to the booking server;
   (d) communicating the voice message to a human operator using the interactive voice response facility;
   (e) receiving from the human operator, via the interactive voice response facility, confirmation or refusal of the reservation request;
   (f) informing the user of the confirmation or refusal of the reservation request;
   (g) storing, to the booking database, information regarding completed bookings attributable to the venue; and
   (h) collecting a payment from the business.

3. The method according to claim 1, wherein modifying the web-page is performed dynamically through execution of the code module incorporated within the web page by any one selected from the set comprising:
   a web-server when publishing the web-page, in response to the user requesting the web-page; and
   a web-browser when rendering the web-page, in response to the user requesting the web-page.

4. The method according to claim 1, wherein modifying the web page content operatively associates the first reference data with a hyperlink to the first web-link, the first reference data being a static text string indicative of the reservation telephone number of the first venue, and first web-link being either a URL or a web application.

5. The method according to claim 1 wherein the reservation data comprises a name of the venue, a date and time of requested reservation, a name of the user and contact details of the user.

6. The method according to claim 5, wherein the reservation data pertains to an order and the reservation data comprises details of an item ordered.

7. The method according to claim 5, wherein the database comprises register records each indicative of a registered user.

8. The method according to claim 7, wherein the reservation data further comprises personal information of the user for checking against register records for confirming registration of the user.

9. The method according to claim 2, wherein the database stores payment and billing information relating to each venue.

10. The method according to claim 9, wherein the user is rewarded according to a customer loyalty scheme.

11. The method according to claim 1, wherein reservation request includes any one or more of the following: a meeting request, booking request and an order request.

12. The method according to claim 1, wherein the method enables the user to make restaurant bookings.

13. The method of claim 2, wherein a commission is paid by an operator of the booking server to an operator of the web-site.

14. The method of claim 2, wherein the database has one or more data records each indicative of a venue including any one or more venues:
   registered in respect of the web-site, whereby the registration has been communicated to the booking server by an operator of the web site;
   registered in respect of the booking server;
   identified as a unregistered venue.

15. A processor apparatus for making a reservation; the apparatus comprising:
   a processor device having a user access interface;
   the user access interface receives a first web-page from a web-server;
   wherein the web-server stores a web-site on a computer usable non-transient storage medium; the web site includes the first web page, the first web page comprises a first reference data indicative of a reservation telephone number of a first venue, the first web page further incorporates a code module;
   wherein the apparatus is coupled to a database having a plurality of data records each indicative of a respective one of a plurality of registered venues;
   wherein the interface comprising a control module that executes the code module incorporated within the web page comprising the first reference data such that the apparatus:
   identifies, within the web-page, the first reference data indicative of a reservation telephone number of a first venue;
   upon identification of the first reference data indicative of a reservation telephone number comprised within the web-page, queries the database using the first reference data indicative of a reservation telephone number for confirming if the first venue is one of the plurality of registered venues having a respective first data record;
   if the first venue is one of the plurality of registered venues, obtains the first data record indicative of the first venue, the first data record including data indicative of a first web-link for accessing a remote booking server to make a reservation request with the first venue using an interactive voice response facility;
   if the first venue is one of the plurality of registered venues and the first data record is obtained, modifies the web-page content of the first reference data indicative of a reservation telephone number by operatively associating the first reference data with a hyperlink of the first web-link for enabling a reservation request with the first venue using an interactive voice response facility; and
   if the first venue is one of the plurality of registered venues and the first data record is obtained, upon modification of the web page, when the hyperlink of the first web-link is selected by the user, prompts the user for reservation data indicative of a reservation request for the first venue, the reservation data including a user specified time and a user specified date; and
   if the first venue is one of the plurality of registered venues and the first data record is obtained, upon modification of the web page and receipt of the reservation date, transmits the reservation data to a remote booking server that is coupled to interactive voice response facility.

16. The apparatus according to claim 15, wherein upon publishing the web-page in response to the user requesting the web-page, the web-page is updated dynamically by a web-server to incorporate the first web-link.

17. The apparatus according to claim 15, wherein in response to the user requesting the web-page, the web-page is dynamically rendered by a web-browser to incorporate the first web-link.

18. The apparatus according to claim 17, wherein the web-page is dynamically parsed and amended by a code module operatively associated with the web-page, thereby to incorporate the first web-link.

19. The apparatus according to claim 15, wherein the user is enabled to make restaurant bookings.

20. A system for enabling a user of a web-site to make a reservation request, for the benefit of the user, the system comprising:
   a database having a plurality of data records each indicative of a respective one of a plurality of registered venues;
   a plurality of web-sites stored on a computer usable non-transient storage medium; a web-site having a first web-page that includes one or more reference data indicative of a reservation telephone number of a venue; the first web-page further incorporating a code module;
   a web-server publishes the first web-page having a first reference data that is indicative of a reservation telephone number of a first venue, the first venue being one of the plurality of registered venues and having a corresponding first data record in the database, the database being accessible for obtaining the first data record, the first data record including data indicative of a first web-link for accessing a remote booking server to make a reservation request with the first venue using an interactive voice response facility;
   wherein the web-page content of the first reference data, indicative of a reservation telephone number of the first venue being one of the plurality of registered venues, is dynamically modified by the system through execution of the code module incorporated within the web page, such that upon identification of the first reference data indicative of a reservation telephone number, the content of the first reference data indicative of a reservation telephone number is operatively associated with a hyperlink of the first web-link for making a reservation request with the first venue using an interactive voice response facility;

a booking module for the user to provide reservation data indicative of a reservation request for the first venue being one of the plurality registered venues;

a booking server adapted to receive the reservation data from the booking module, to retrieve contact information for the first venue being one of the plurality registered venues, create a voice message from the reservation data and contact information, the voice message being indicative of the reservation request, and enabling transmission of the voice message via the interactive voice response facility for communicating the voice message to an operator at the first venue, receiving from the operator confirmation of acceptance or rejection of the request, and informing the user of the operator acceptance or rejection.

21. The method according to claim 1, wherein:

if the first venue is not one of the plurality of registered venues, the first data record is not obtained and the code module does not modify the web-page content of the first reference data.

22. The method according to claim 21, wherein the reservation telephone number remains published on the web page.

23. The apparatus according to claim 15, wherein:

if the first venue is not one of the plurality of registered venues, the first data record is not obtained, and the web-page content of the first reference data is not modified.

* * * * *